United States Patent
Claeys et al.

(10) Patent No.: US 8,600,596 B2
(45) Date of Patent: Dec. 3, 2013

(54) SYSTEM AND METHOD FOR CONTROLLING A FOUR WHEEL DRIVE VEHICLE

(75) Inventors: Xavier Claeys, Paris (FR); Marco Marsilia, Boulogne-Billancourt (FR); Francois Foussard, Rouen (FR)

(73) Assignee: Renault S.A.S., Boulogne-Billancourt (FR)

( * ) Notice: Subject to any disclaimer, the term of this patent is extended or adjusted under 35 U.S.C. 154(b) by 360 days.

(21) Appl. No.: 12/993,316

(22) PCT Filed: May 14, 2009

(86) PCT No.: PCT/FR2009/050897
§ 371 (c)(1),
(2), (4) Date: Feb. 14, 2011

(87) PCT Pub. No.: WO2009/150346
PCT Pub. Date: Dec. 17, 2009

(65) Prior Publication Data
US 2011/0130909 A1    Jun. 2, 2011

(30) Foreign Application Priority Data
May 20, 2008 (FR) ...................................... 08 53272

(51) Int. Cl.
*B60L 9/00* (2006.01)
*G06F 7/70* (2006.01)
*B60W 10/00* (2006.01)

(52) U.S. Cl.
USPC ........................... 701/22; 701/70; 180/65.265

(58) Field of Classification Search
None
See application file for complete search history.

(56) References Cited

U.S. PATENT DOCUMENTS

| 4,962,969 A | 10/1990 | Davis |
| 6,957,874 B2 | 10/2005 | Hara et al. |
| 7,216,943 B2 | 5/2007 | Nishikawa et al. |
| 2002/0180266 A1 | 12/2002 | Hara et al. |
| 2003/0132044 A1 | 7/2003 | Kitano et al. |
| 2005/0099146 A1 | 5/2005 | Nishikawa et al. |

FOREIGN PATENT DOCUMENTS

| EP | 0 361 708 | 4/1990 |
| FR | 2 901 762 | 12/2007 |
| FR | 2 906 778 | 4/2008 |

OTHER PUBLICATIONS

International Search Report issued Nov. 4, 2009 in PCT/FR09/050897 filed May 14, 2009.

*Primary Examiner* — Mussa A Shaawat
(74) *Attorney, Agent, or Firm* — Oblon, Spivak, McClelland, Maier & Neustadt, L.L.P.

(57) ABSTRACT

The invention relates to a four wheel drive hybrid vehicle provided with at least one power train on each wheel set, a first power train (1) including at least one heat engine, a second power train (2) including at least one electric machine, the vehicle also being provided with a friction braking system on each drive wheel and sensor (7). The control system includes: a means (9) for distributing a braking request between the friction braking system and at least one electric machine from a power train, said electric machine being capable of producing a resisting torque; a torque instruction modulation means (10) for modulating torque instructions to braking systems and power trains based on signals coming from the sensors; and a power train control means (8); the distribution means (9), the torque instruction modulation means (10), and the power train control means (8) being capable of dynamically interacting so as to output torque commands to the power trains and to the friction braking systems with a view to promoting the stability of the vehicle.

10 Claims, 5 Drawing Sheets

SYSTEM AND METHOD FOR CONTROLLING A FOUR WHEEL DRIVE VEHICLE

BACKGROUND

The present invention relates to the field of motor vehicle control systems and, more particularly, to control systems for powertrains and braking devices for hybrid motor vehicles.

Vehicles incorporating electrical machines to propel them are increasingly prized for their quietness and the fuel savings they have to offer.

However, co-ordinating these electrical machines with one another or with other propulsion systems entails advanced control electronics. Moreover, as the braking functions can be provided partly by operating these electrical machines as generators, it is important also to control the braking aspect.

BRIEF SUMMARY

Hence, there is a need for a control system capable of managing the integration of the electrical machines into the propulsion and braking functions of a motor vehicle.

The subject of the present invention is a system and a method for controlling the electrical machines of a four-wheel drive vehicle.

Another subject of the invention is a system and a method for controlling the electrical machines of a four-wheel drive vehicle used as a braking system.

One aspect of the invention defines a system for controlling a motor vehicle of the four-wheel drive hybrid propulsion type equipped with at least one powertrain on each wheelset, a first powertrain comprising at least one combustion engine, a second powertrain comprising at least one electrical machine, the vehicle also being equipped with a friction braking system on each of the driven wheels and with sensors.

The control system comprises a distributing means for distributing a braking request between the friction braking system and at least one electrical machine of a powertrain, said electrical machine being capable of delivering a resistive torque,
  a modulating means for modulating the torque setpoints intended for the braking systems and for the powertrains as a function of the signals from the sensors,
  a control means for controlling the powertrains,
  the brake force distributing means, the torque setpoint modulating means and the powertrain control means being capable of dynamically interacting in order to issue torque commands to the powertrains and to the friction braking systems in order to promote the stability of the vehicle.

The control system may be applied to a vehicle equipped with driver assist means. The means of determining the stability may comprise a braking co-ordinating device capable of taking into consideration in a concerted and prioritized manner the signals from the driver assist means.

The powertrain control means may further comprise an engine torque co-ordinating device capable of taking into consideration in a concerted and prioritized manner the signals from the driver assist means, from the sensors and from the means of determining the stability of the vehicle.

The first powertrain may be connected to the front wheelset and the second powertrain may be connected to the rear wheelset, the torque setpoint modulating means then being capable of limiting the recuperative braking of the rear wheelset in order to promote the grip of said rear wheelset.

The means of determining the stability of the vehicle may comprise a control means able to exert an influence on the friction braking system which does not generate force torque but which does reduce the response time for a later demand.

Another aspect of the invention defines a method for controlling a motor vehicle of the four-wheel drive hybrid propulsion type equipped with at least one powertrain on each wheelset, a first powertrain comprising at least one combustion engine, a second powertrain comprising at least one electrical machine. The control method comprises steps during which:
  the driver braking request is distributed between the friction braking and the recuperative braking of the electrical machines of the powertrains according to the estimated speed of the vehicle, to the depression of the brake pedal and to the angle through which the steered wheels are turned,
  ranges of recuperative braking torque supplied by the electrical machines of a powertrain are determined for the front wheelset, for the rear wheelset, and under static and dynamic conditions;
  braking torques for each friction braking device are determined as a function of the stability of the vehicle,
  recuperative braking torques for the front wheelset under static conditions, for the rear wheelset under static conditions, for the front wheelset under dynamic conditions and for the front wheelset under dynamic conditions are determined within the ranges of recuperative braking torque previously determined, the braking torques being determined as a function of the friction braking torques of each friction braking device.

Furthermore, the control method may be applied to a vehicle equipped with driver assist means. The taking into consideration of the braking torque setpoints from the driver assist means may then be prioritized in order to determine braking setpoints that will promote the stability of the vehicle.

The recuperative braking on the rear wheelset may be limited in order to promote the stability of the vehicle.

A minimum friction braking torque setpoint may also be determined in order to increase the speed of response of the braking devices in case of a braking request involving significant use of the friction braking.

A range of torques supplied by the powertrains may be determined as a function of the torque requests on the part of the driver and of the driver assist means.

BRIEF DESCRIPTION OF THE DRAWINGS

Other objects, features and advantages will become apparent from reading the following description given solely by way of nonlimiting example and made with reference to the accompanying drawings in which.

DETAILED DESCRIPTION

Figure 1:
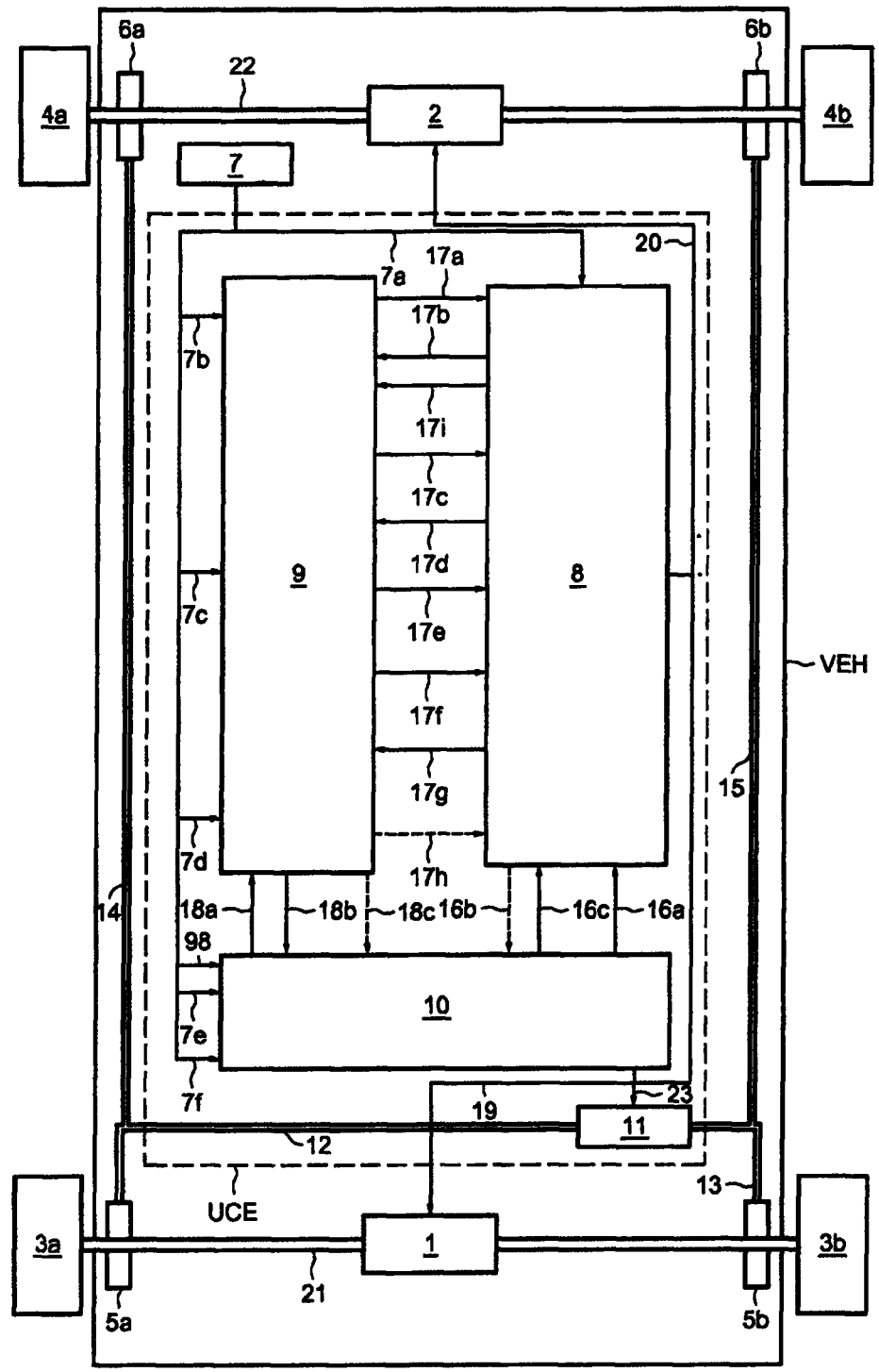
FIG. 1 illustrates the main elements involved in a vehicle equipped with a control system.

FIG. 1 shows a motor vehicle termed VEH comprising the main parts of a control system. The vehicle VEH comprises a front powertrain 1 connected to a front wheelset 3a; 3b via an axle 21 and a rear powertrain 2 connected to a rear wheelset 4a; 4b by an axle 22. The wheel 3a is equipped with a braking device 5a, the wheel 3b with a device 5b, the wheel 4a with a device 6a and the wheel 4b with a device 6b.

An electronic control unit identified by the reference UCE controls the braking devices 5a, 5b, 6a and 6b via the connections 12, 13, 14 and 15. The electronic control unit UCE also controls the front 1 and rear 2 powertrains via the links 19 and 20 respectively.

The electronic control unit UCE is connected to sensors by connections 7a, 7b, 7c, 7d, 7e and 7f. The electronic control unit UCE comprises a means 8 of controlling the powertrains, a means 9 of distributing a braking request, a means 10 of modulating the torque setpoints and a system 11 for controlling the braking devices. The powertrain control means 8 is connected at output by the connection 19 to the front powertrain 1, by the connection 20 to the rear powertrain 2. The braking device control system 11 is connected by the connection 12 and by the connections 13, 14 and 15 to the braking devices 5a, 5b, 6a and 6b.

The means 9 for distributing a braking request and the means 10 for modulating the torque setpoints intended for the braking systems and for the powertrains are interconnected by the connections 18a, 18b and 18c. The brake request distribution means 9 is connected to the powertrain control means 8 by the connections 17a, 17b, 17c, 17d, 17e, 17f, 17g, 17h and 17i. The means 10 for modulating the torque setpoints intended for the braking systems and for the powertrains is connected to the powertrain control means 8 by the connections 16a, 16b and 16c. The means 10 for modulating the torque setpoints intended for the braking systems and for the powertrains is connected to the braking device control system 11 by the connection 23.

Figure 2:
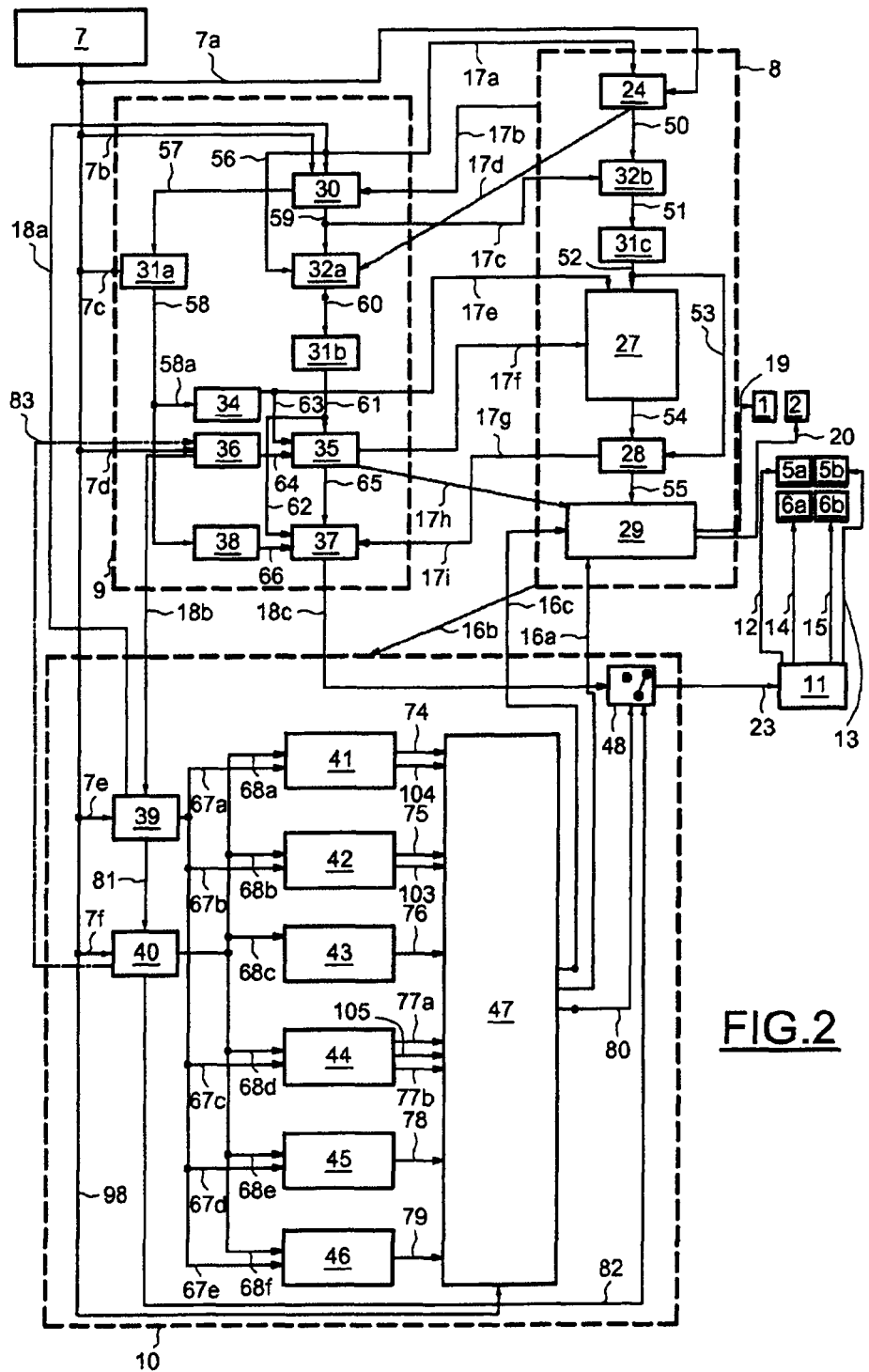
FIG. 2 illustrates the main elements involved in a control system.

FIG. 2 shows the various means involved in the control system, notably the powertrain control means 8, a brake request distribution means 9 and a torque setpoint modulating means 10.

The means 9 for distributing a braking request comprises the following components:

a brake pedal interpretation means 30 is connected via the connection 18a to a computing means 39 that computes the reference speed contained in the modulating means 10. The interpretation means 30 is also connected at input to the sensor 7 by the branch 7b of the connection 7a, and to the powertrain control means 8 by the connection 17b.

The interpretation means 30 is connected at output to a compensation means 31a by the connection 57 and to a computing means 32a for computing the acceleration of the vehicle by the connection 59.

The means 32a for computing the acceleration of the vehicle is connected by the branch 56 of the connection 18a to the computing means 39 that computes the reference speed contained in the modulating means 10. The computing means 32a for computing the acceleration is also connected at input, by the connection 17d, to the means 24 of interpreting the acceleration pedal of the powertrain control means 8. The computing means 32a that computes the acceleration is connected at output to the compensation means 31b by the connection 60.

The compensation means 31b is connected to the means 35 of determining the distribution of the recuperative braking between the front and rear wheelsets by the connection 61, and to the friction braking compensating means 37 by the branch 62 of the connection 61.

The compensation means 31a is connected by one of its inputs to the sensors 7 via the branch 7c. The compensation means 31a is connected at output to the means 34 of determining the maximum recuperative braking by the branch 58a of the connection 58, and to the means 38 for determining the prebraking setpoint by the connection 58.

The means 34 for determining the maximum recuperative braking is connected by one of its outputs to the powertrain setpoint optimizing means 27 of the powertrain control means 8 by the connection 17e. The means 34 of determining the maximum recuperative braking is also connected at output by the branch 63 of the connection 17e to the means 35 of determining the distribution of the recuperative braking between the front and the rear wheelsets.

The means 36 for interpreting the situation is connected at input by the connection 7d to the sensors 7. The interpretation means 36 is connected at output by the connection 64 to the means 35 of determining the distribution of the recuperative braking between the front and rear wheelsets. The interpretation means 36 is also connected at output by the connection 18b to the means 39 of computing the reference speed contained in the modulating means 10.

The means 38 for determining the prebraking setpoint is connected at output to the friction braking compensating means 37 by the connection 66.

The means 35 for determining the distribution of the recuperative braking between the front and rear wheelsets is connected by its outputs to the friction braking compensating means 37 by the connection 65, to the means 27 of optimizing the powertrain setpoints of the control means 8 by the connection 17f and to the engine torque coordinating device 29 by the connection 17h.

The means 37 for compensating for the friction braking is connected by one of its inputs to the means 28 of dynamic compensation of the powertrain setpoints contained in the powertrain control means 8 by the connection 17i. The compensation means 37 is connected at output by the connection 18c to the switch 48 of the modulating means 10.

The means 10 for modulating the torque setpoints intended for the braking systems and for the powertrains comprises the following main components:

the computing means 39 for computing the reference speed is connected at input to the sensors 7 by the connection 7e and to the situation interpreting means 36 by the connection 18b. The computing means 39 is connected at output to the interpretation means 30 by the connection 18a, to the situation determining means by the connection 81, to an electronic stability control device 41 (usually known by its electronic stability program abbreviation ESP) by the connection 67a, to an ABS device 42 by the connection 67b, to a traction control device 44 by the connection 67c, to a device preventing recuperative braking on the rear wheelset 45 by the connection 67d and to a device supporting the reference speed 46 by the connection 67e.

The situation determining means 40 is connected at input to the sensors 7 by the connection 7f. The situation determining means 40 is connected at output to the switch 48 by the connection 82, to the electronic stability control device 41 by the connection 68a, to the ABS device 42 by the connection 68b, to an HBD (Hybrid Brake-force Distribution) device by the connection 68c, to the traction control device 44 by the connection 68d, to the device preventing recuperative braking on the rear wheelset 45 by the connection 68e and to the reference speed maintaining device 46 by the connection 68f.

The device 47 for coordinating the braking is connected by its inputs to the ESP device 41 by the connections 74 and 104, to the ABS device 42 by the connections 75 and 103, to the HBD device 43 by the connection 76, to the traction control device 44 by the connections 77a, 77b and 105, to the device preventing recuperative braking on the rear wheelset 45 by the connection 78 and to the reference speed maintaining device 46 by the connection 79.

The device for coordinating the braking 47 is connected by its outputs to the switch 48 by the connection 80 and to the device 29 for coordinating engine torque by the connections 16a and 16c.

The switch 48 is connected at output to the braking device control system 11 via the connection 23.

The means 8 for controlling the powertrains comprises the following main components:

the means 24 for interpreting the accelerator pedal is connected by one of its inputs to the sensors 7 by the connection 7a. The interpretation means 24 is connected by one of its outputs to the means 32b for computing the acceleration of the vehicle by the connection 50.

The vehicle acceleration computing means 32b is connected at input to the brake pedal interpreting means 30 by the branch 17c of the connection 59. The vehicle acceleration computing means 32b is connected at output to the compensation means 31c by the connection 51.

The compensation means 31c is connected at output to the means 27 of optimizing the powertrain setpoints by the connection 52, and to the means 28 for dynamically compensating the powertrain setpoints by the branch 53 of the connection 52.

The powertrain setpoint optimizing means 27 is connected by at least one of its inputs to the means 34 of determining the maximum recuperative braking by the connection 17e. The optimizing means 27 is connected at output by the connection 54 to the powertrain setpoint dynamic compensating means 28.

The powertrain setpoint dynamic compensating means 28 is connected by at least one of its inputs by the branch 53 of the connection 52 to the compensating means 31c. The powertrain setpoint dynamic compensating means 28 is connected by at least one of its outputs to the engine torque coordinating device 29 by the connection 55 and to the friction braking compensating means 37 by the connection 17i.

The engine torque coordinating device 29 is connected by at least one of its inputs to the means 35 of determining the distribution of recuperative braking between the front and rear wheelsets by the connection 17h and is connected by the connection 16c to the braking coordination device 47. The engine torque coordinating device 29 is connected at output to the front 1 and rear 2 powertrains by the connections 19 and 20.

The sensors 7 supply information regarding the position of the brake pedal XBP_sens or the position of the master cylinder P_MC_sens to the interpreting means 30. The interpreting means 30 also receives an estimate of the longitudinal speed of the vehicle VVH_x_est by the connection 18a and the minimum deceleration generated by the mechanical resistance of the powertrains for zero acceleration GPT_min, also known as the foot-off deceleration.

The interpreting means 30 then determines the deceleration due to the depressing of the brake pedal GBP_sp and the derivative with respect to time of the deceleration due to the depressing of the brake pedal dGBP_sp. The variables GBP_sp and dGBP_sp are emitted by the connection 57 and the variable GBP_sp is emitted by the connection 59.

The means 32a for computing the acceleration of the vehicle receives the estimate of the longitudinal speed of the vehicle VVH_x_est by the branch 56 and receives the acceleration generated by the powertrains GPT_sp. The vehicle acceleration computing means 32a then determines the vehicle acceleration setpoint GWH_sp according to the driver request.

The compensating means 31b then receives the vehicle acceleration setpoint GWH_sp and determines the total vehicle torque setpoint TWH_sp by applying the following relationship:

$$TWH\_sp = M \cdot R \cdot GWH\_sp$$

where M is the estimated mass of the vehicle and R is the estimated radius of the wheel.

At the same time, the compensating means 31a receives as input the variables GBP_sp and dGBP_sp. The compensating means 31a then determines the torque associated with the depressing of the brake pedal TBP_sp and the derivative of the torque associated with the depressing of the brake pedal dTBP_sp.

$$TBP\_sp = M \cdot R \cdot GBP\_sp$$

$$dTBP\_sp = M \cdot R \cdot dGBP\_sp$$

The means 34 for determining the maximum recuperative braking receives as input the torque associated with the depressing of the brake pedal TBP_sp and the derivative of the torque associated with the depressing of the brake pedal dTBP_sp. The means 34 of determining the maximum recuperative braking then determines the minimum braking torque excluding friction braking TNBP_min.

The means 36 of interpreting the situation receives, from the sensors 7, the angle through which the wheels are turned ASW_sens. Further, the situation interpreting means 36 receives logic signals reflecting the fact that recuperative braking on the rear wheelset has been prevented Flag_int_recup and the fact that optimized four-wheel drive mode has been activated Flag__4wd_opt, each of these two signals originating from the torque setpoint modulating means 10.

The means 36 for interpreting the situation then determines the traction grip potential threshold Mu_trac, the recuperative braking grip potential threshold Mu_recup, the traction grip potential dynamic threshold Mu_trac_dyn, and the recuperative braking grip potential dynamic threshold Mu_recup_dyn.

The determining means 35 receives the vehicle total torque setpoint TWH_sp, the minimum braking torque excluding friction braking TNBP_min, the traction grip potential threshold Mu_trac, the recuperative braking grip potential threshold Mu_recup, the traction grip potential dynamic threshold Mu_trac_dyn, and the recuperative braking grip potential dynamic threshold Mu_recup_dyn.

The determining means 35 then determines the minimum torque on the rear axle in near-static conditions TPT_r_min, the maximum torque on the rear axle under near-static conditions TPT_r_max, the minimum torque on the rear axle under transient conditions TPT_r_min_trans and the maximum torque on the rear axle under transient conditions TPT_r_max_trans.

At the same time, the determining means 38 receives the torque associated with the depressing of the brake pedal TBP_sp and the derivative of the torque associated with the depressing of the brake pedal dTBP_sp and determines the braking torque directly applied to the brakes ΔFBP_sp.

The friction braking compensating means 37 receives the vehicle total torque setpoint TWH_sp, the minimum torque on the rear axle under near-static conditions TPT_r_min, the maximum torque on the rear axle under near-static conditions TPT_r_max, the torque setpoint of the rear powertrain TPT_r_osp, the torque setpoint of the front powertrain TPT_f_osp and the braking torque directly applied to the brakes ΔFBP_sp.

The friction braking compensating means 37 then determines the braking torque of the rear left wheel TFB_rl_osp compensated as a function of the resistive torque of the rear powertrain TPT_r_osp, the braking torque of the rear right wheel TFB_rr_osp compensated as a function of the resistive torque of the rear powertrain TPT_r_osp, the braking torque of the front left wheel TFB_fl_osp as a function of the resistive torque of the front powertrain TPT_f_osp and the braking torque of the front right wheel TFB_fr_osp compensated as a function of the front powertrain TPT_f_osp.

In the powertrain control means 8, the accelerator pedal interpreting means 24 receives information relating to the depressing of the accelerator pedal and to the gear ratio from the sensors 7. The interpreting means 24 further receives the estimate of the longitudinal speed of the vehicle VVH_x_est. The interpreting means 24 at output determines the acceleration generated by the powertrains GPT_sp.

The vehicle acceleration computing means 32b receives the acceleration generated by the powertrains GPT_sp and determines the vehicle acceleration setpoint GWH_sp.

It should be noted that the operation of the means 32a and 32b may be merged into a single means distributed across the means 8 and 9.

The compensating means 31c receives the vehicle acceleration setpoint GWH_sp and determines the vehicle total torque setpoint TWH_sp by applying the following relationship:

TWH_sp=M·R·GWH_sp where M is the estimated-mass of the vehicle and
R is the estimated radius of the wheel.

Here again, it should be noted that the means 31a, 31b, and 31c can be merged, their functions then being distributed across the means 8 and 9.

The powertrain setpoint optimizing means 27 receives at input, in addition to the value TWH_sp, the minimum braking torque excluding friction braking TNBP_min and the minimum torque on the rear axle under near-static conditions TPT_r_min, the maximum torque on the rear axle under near-static conditions TPT_r_max, the minimum torque on the rear axle under transient conditions TPT_r_min_trans and the maximum torque on the rear axle under transient conditions TPT_r_max_trans.

The powertrain setpoint dynamic compensating means 28 emits at output the values of torque of the front powertrain TPT_f_osp, of torque of the rear powertrain TPT_r_osp and the gear ratio RCL_f_osp.

Figure 3:
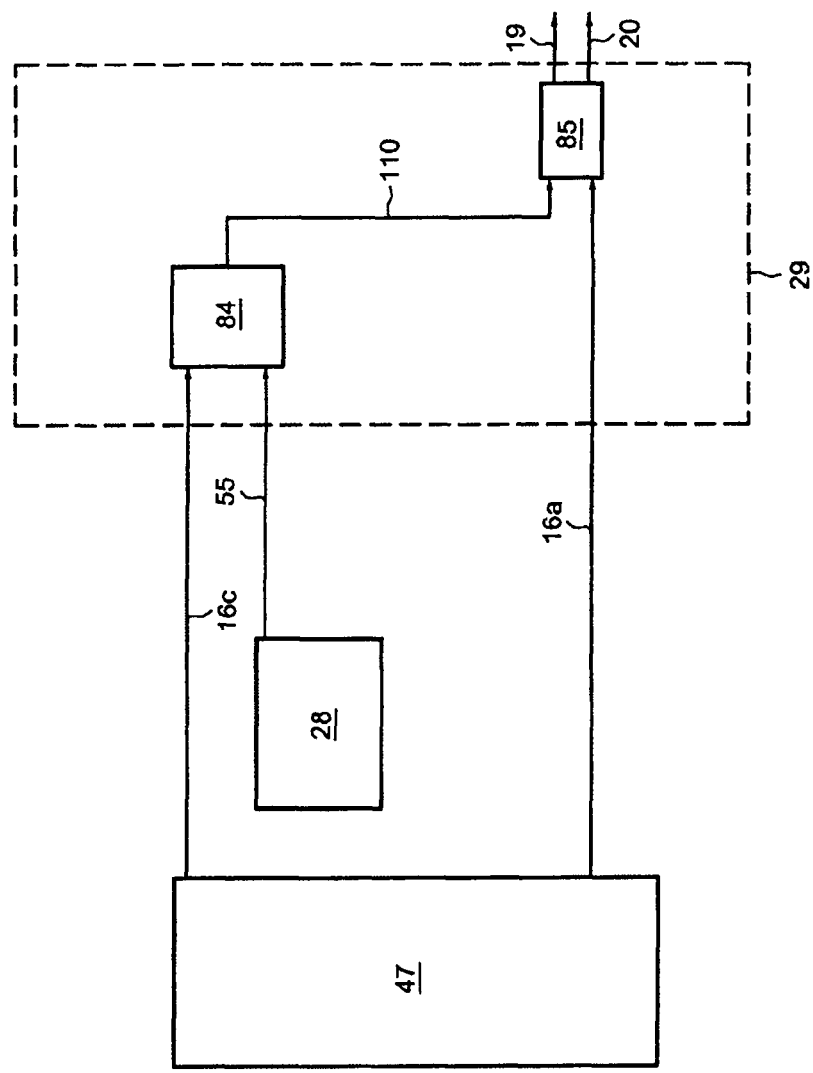
FIG. 3 illustrates the main elements involved in an engine torque coordinating device.

The engine torque coordinating device 29 receives from the braking coordinating device 47 the values of minimum torque on the rear axle under static conditions TPT_r_min_stat, of maximum torque on the rear axle under static conditions TPT_r_max_stat, of minimum torque on the rear axle under dynamic conditions TPT_r_min_dyn, of maximum torque on the rear axle under dynamic conditions TPT_r_max_dyn, of minimum torque on the front axle under static conditions TPT_f_min_stat, of maximum torque on the front axle under static conditions TPT_f_max_stat, of minimum torque on the front axle under dynamic conditions TPT_f_min_dyn, of maximum torque on the front axle under dynamic conditions TPT_f_max_dyn, and of gear ratio RCL_f_tgt. The engine torque coordinating device 29 also receives the values of torque of the front powertrain TPT_f_osp, of torque of the rear powertrain TPT_r_osp from the dynamic compensating means 28. The coordinating device 29 comprises the components described in FIG. 3.

The coordinating device 29 comprises a computing means and a computing means 85. The computing means 84 receives on its inputs the values of minimum torque on the rear axle under static conditions TPT_r_min_stat, of minimum torque on the rear axle under dynamic conditions TPT_r_min_dyn, of minimum torque on the front axle under static conditions TPT_f_min_stat and of minimum torque on the front axle under dynamic conditions TPT_f_min_dyn. The computing means also receives the values of torque of the front powertrain TPT_f_osp, of torque of the rear powertrain TPT_r_osp from the dynamic compensating means 28. The computing means 84 determines the maximum value of torque that can be applied to the front and rear powertrains. These two values are transmitted to the computing means 85 by the connection 110.

The computing means 85 receives on its inputs the values of maximum torque on the rear axle under static conditions TPT_r_max_stat, of maximum torque on the rear axle under dynamic conditions TPT_r_max_dyn, of maximum torque on the front axle under static conditions TPT_f_max_stat and of maximum torque on the front axle under dynamic conditions TPT_f_max_dyn.

The computing means 85 then determines the minimum values from among the values received, these values being emitted at output by way of target torque values TPT_f_tgt and TPT_r_tgt for the front and rear powertrains respectively.

The means 10 for modulating the torque setpoints intended for the braking systems and for the powertrains receives, via the reference speed computing means 39, the traction grip potential threshold Mu_trac, the recuperative braking grip potential threshold Mu_recup, the traction grip potential dynamic threshold Mu_trac_dyn, and the recuperative braking grip potential dynamic threshold Mu_recup_dyn. It also receives, from the sensors 7, wheel speed values. At output, it determines an estimate of the longitudinal speed of the vehicle VVH_x_est, and emits two logic signals preventing recuperative braking from being used on the rear wheelset Flag_int_recup and for activating the optimized four-wheel drive mode Flag__4wd_opt. The computing means 39 is also connected by the connections 67a, 67b, 67c, 67d and 67e to the ESP device 41, the ABS device 42, the traction control device 44, the device for preventing recuperative braking on the rear wheelset 45 and the device for maintaining the reference speed 46.

A means 40 for determining the situation determines the situation of the vehicle from the data received from the reference speed computing means 39 and from the wheel speed received from the sensors 7. It is connected by the connections 68a, 68b, 68c, 68d, 68e and 68f to the ESP device 41, the ABS device 42, the HBD device 43, the traction control device 44, the device for preventing recuperative braking on the rear wheelset 45 and the reference speed maintaining device 46. The determining means 40 is also connected to the switch 48 by the connection 82.

The driver assist and vehicle safety devices such as the ESP device 41, the ABS device 42, the HBD device 43, the traction control device 44, the device preventing recuperative braking on the rear wheelset 45 and the device for maintaining the reference speed 46 are known per se and will not be described here.

The device 47 for coordinating the braking comprises two parallel structures. A first structure is used to determine the engine torques intended for the engine torque coordinating device 29 and a second structure is used to determine the resistive torques intended for the switch 48 and for the braking systems 5*a*, 5*b*, 6*a* and 6*b*.

Figure 4:
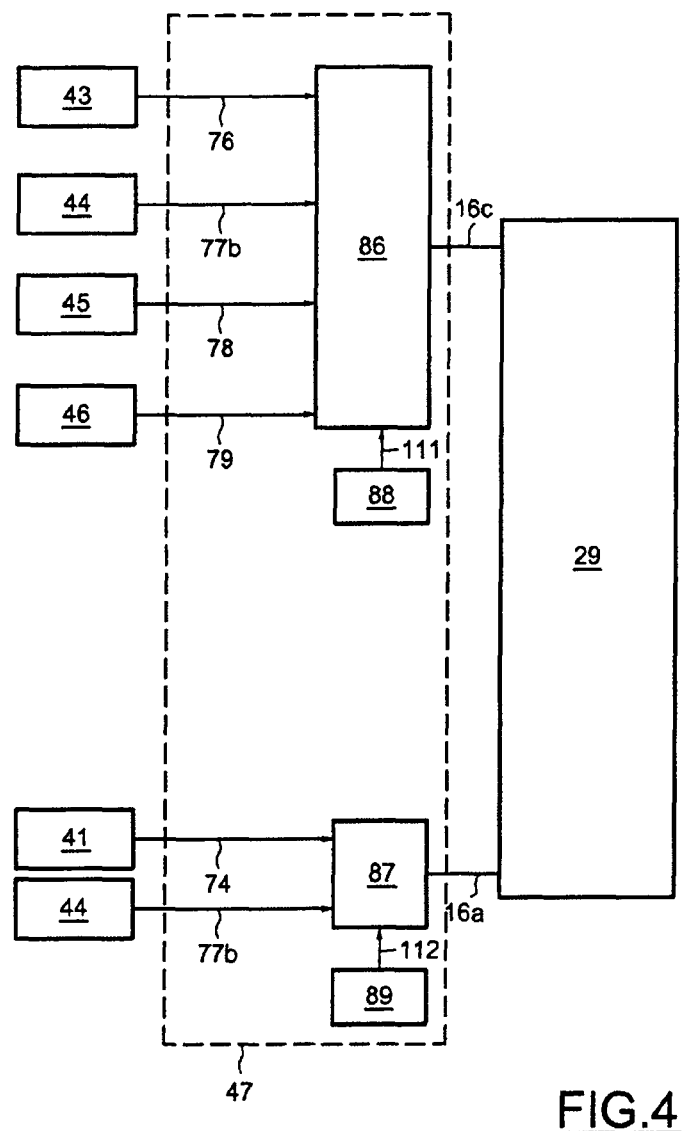
FIGS. 4 and 5 illustrate the main elements involved in a braking coordinating device.

The first structure is described in FIG. 4. The ESP 41, ABS 42, HBD 43 and traction control 44 devices are connected to a computing means 86 by the connections 76, 77*b*, 78 and 79. The computing means 86 is also connected to a memory 88 by the connection 111.

The devices 45 for preventing recuperative braking on the rear wheelset and for maintaining the reference speed 46 are connected to a computing means 87 by the respective links 74 and 77*b*. The computing means 87 is also connected to a memory 89 by the connection 112.

The computing means 86 receives the torque couples setpoints from the ESP 41, the ABS 42, the HBD 43 and the traction control 44 devices. The computing means 86 also receives, from the memory 88, a threshold value corresponding to the minimum value expected at output of the computing means 86. The values of minimum torque on the rear axle under static conditions TPT_r_min_stat, of minimum torque on the rear axle under dynamic conditions TPT_r_min_dyn, of minimum torque on the front axle under static conditions TPT_f_min_stat and of minimum torque on the front axle under dynamic conditions TPT_f_min_dyn are emitted at output of the computing means 86 via the connection 16*c*.

At the same time, the computing means 87 receives the torque couples setpoints from the device 45 for preventing recuperative braking on the rear wheelset and the device 46 for maintaining the reference speed. The computing means 87 also receives a threshold value corresponding to the minimum value expected at output of the computing means 87. The values of maximum torque on the rear axle under static conditions TPT_r_max_stat, of maximum torque on the rear axle under dynamic conditions TPT_r_max_dyn, of maximum torque on the front axle under static conditions TPT_f_max_stat and of maximum torque on the front axle under dynamic conditions TPT_f_max_dyn are emitted at output of the computing means 86 via the connection 16*a*.

Figure 5:
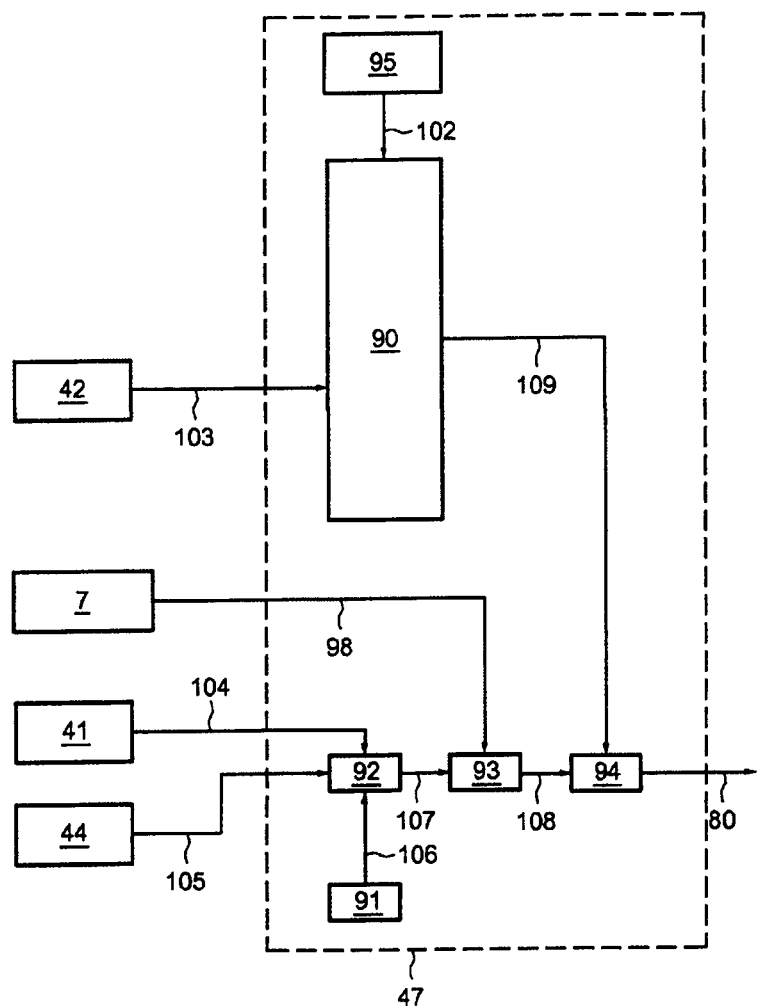

The second structure of the device 47 for coordinating the braking is described in FIG. 5. The braking coordinating device 47 comprises computing means 90, 92, 93 and 94 and a memory 91.

The computing means 90 is connected to the ABS device 42 by the connection 103 and to an electronic brake-force distributor 95 by the connection 102.

The computing means 92 is connected to the ESP device by the connection 104, to the traction control device 44 by the connection 105 and to a memory 91 by the connection 106.

The computing means 93 is connected to the computing means 92 by the connection 107 and to the sensors 7 via the connection 98.

The computing means 94 is connected by the connection 109 to the computing means 90 and by the connection 108 to the computing means 93.

The computing means 90, 92, 93 and 94 receive, on each of their inputs, a value containing four braking torque setpoints each one intended for one of the friction braking devices.

The computing means 90 determines the maximum value from among the signals received on these inputs. To do that, each of the four setpoints received at input is compared against the setpoint of comparable rank on the other input or inputs. For example, the rank i setpoint of the value j is compared against the rank i setpoint of the value k. The minimum setpoint for a rank i is considered from among all the setpoints. This method of comparison is valid for the computing means 92, 93 and 94.

The means 92 and 93 each determine the minimum value from among the values received on their inputs.

Finally, the computing means 94 determines the maximum value from among the signals received on its inputs. This value contains the rear right wheel safe braking torque TFB_rr_tgt, the rear left wheel safe braking torque TFB_rl_tgt, the front left wheel safe braking torque TFB_fl_tgt and the front right wheel safe braking torque TFB_fr_tgt. This value is then emitted by the connection 80.

The switch 48 thus receives on its inputs, via the connection 80, the rear right wheel safe braking torque TFB_rr_tgt, the rear left wheel safe braking torque TFB_rl_tgt, the front left wheel safe braking torque TFB_fl_tgt and the front right wheel safe braking torque TFB_fr_tgt and, via the connection 18*c*, the rear right wheel braking torque TFB_rr_osp, the rear left wheel braking torque TFB_rl_osp, the front left wheel braking torque TFB_fl_osp and the front right wheel braking torque TFB_fr_osp. Further, the switch 48 via the connection 82 receives control signals originating from the means 40.

Thus, according to the situation detected by the means 40, the switch emits at output either the set of safe braking torques determined by the computing means 47 or the set of braking torques determined by the friction braking compensating means 37.

These braking setpoints are emitted via the connection 23 to the braking device control system 11 which in turn forwards the appropriate braking setpoints to each of the friction braking devices 5*a*, 5*b*, 6*a* and 6*b* via the connections 12, 13, 14 and 15.

The control system and method described here allow the full extent of the drive and of the braking of a hybrid vehicle to be taken into consideration. A bipolar approach split between a device that determines torque and braking setpoints according to driver requests and a device that interprets the various signals from the sensors and driver assist and safety devices of the vehicle allows said driver requests to be modulated in such a way as to keep the vehicle under driving conditions that are compatible with vehicle safety.

The invention claimed is:

1. A system for controlling a motor vehicle of the four-wheel drive hybrid propulsion type equipped with at least one powertrain on each wheelset, a first powertrain comprising at least one combustion engine, a second powertrain comprising at least one electrical machine, the vehicle also being equipped with a friction braking system on each of the driven wheels and with sensors, said system comprising:

a distributing unit configured to distribute a braking request between the friction braking system and at least one electrical machine of a powertrain, said braking request including a braking torque for the friction braking system of each of the driven wheels according to requests from a driver of the vehicle, said electrical machine being configured to deliver a resistive torque;

a modulating unit configured to modulate the torque setpoints of the braking systems and of the powertrains as a function of the signals from the sensors, the modulating unit including a braking coordinating device configured to output a braking request including a safe braking torque for the friction braking system of each of the driven wheels according to safety devices of the vehicle; and a powertrain control unit configured to control the powertrains, wherein the distributing unit includes a situation determining device configured to select between the braking request of the distributing unit and the braking request of the modulating unit to issue torque commands to the powertrains and to the friction braking systems in order to promote stability of the vehicle.

2. The control system as claimed in claim 1 wherein the braking coordinating device takes into consideration in a concerted and prioritized manner signals from the safety devices of the vehicle.

3. The control system as claimed in claim 2, wherein the powertrain control unit comprises a dynamic compensation unit that dynamically compensates the setpoints, and an engine torque coordinating device that takes into consideration in a concerted and prioritized manner the signals from the safety devices, from the sensors, from the distributing unit, and from the dynamic compensation unit.

4. The control system as claimed in claim 1, wherein the first powertrain is connected to the front wheelset and the second powertrain is connected to the rear wheelset, and the modulating unit limits recuperative braking of the rear wheelset in order to promote grip of said rear wheelset.

5. The control system as claimed in claim 1, in which the distributing unit comprises a determining unit that determines a prebraking setpoint to exert an influence on the friction braking system which does not generate force torque but which does reduce a response time for a later demand.

6. A method for controlling a motor vehicle of the four-wheel drive hybrid propulsion type equipped with at least one powertrain on each wheelset, a first powertrain comprising at least one combustion engine, a second powertrain comprising at least one electrical machine, said method comprising:
- distributing a driver braking request between friction braking and recuperative braking of the electrical machines of the powertrains according to an estimated speed of the vehicle, to a depression of the brake pedal and to an angle through which the steered wheels are turned, the braking request including a braking torque for the friction braking device of each of the driven wheels of the vehicle according to requests from a driver of the vehicle;
- determining, by an electronic control unit, ranges of recuperative braking torque supplied by electrical machines of a powertrain, for the front wheelset, for the rear wheelset, and under static and dynamic conditions;
- determining, by the electronic control unit, a braking request including a safety braking torque for the friction braking device of each of the driven wheels of the vehicle as a function of stability of the vehicle;
- determining, by the electronic control unit, recuperative braking torques for the front wheelset under static conditions, for the rear wheelset under static conditions, for the front wheelset under dynamic conditions and for the front wheelset under dynamic conditions within the ranges of recuperative braking torque previously determined, the braking torques being determined as a function of the friction braking torques of each friction braking device; and
- selecting a braking torque to apply to the friction braking device of each of the driven wheels from the braking torques determined according to the requests from the driver and the braking torques determined as a function of the stability of the vehicle, the selecting being performed according to a situation of the vehicle.

7. The control method as claimed in claim 6, wherein the determining the safety braking torque includes taking into consideration braking torque setpoints from driver assist devices that are prioritized in order to determine braking torque setpoints that promote the stability of the vehicle.

8. The control method as claimed in claim 7, wherein the recuperative braking on the rear wheelset is limited in order to promote the stability of the vehicle.

9. The control method as claimed in claim 6, wherein a minimum friction braking torque setpoint is determined in order to increase a speed of response of the braking devices in case of a braking request involving significant use of the friction braking.

10. The control method as claimed in claim 7, wherein a range of torques supplied by the powertrains is determined as a function of the torque requests on the part of the driver and of the driver assist devices.

* * * * *